(12) United States Patent
Boston (10) Patent No.: US 9,392,742 B2
(45) Date of Patent: Jul. 19, 2016

(54) SELF-FILLING AGRICULTURAL TENDER

(71) Applicant: Par-Kan Company, Silver Lake, IN (US)

(72) Inventor: Luke Boston, Warsaw, IN (US)

(73) Assignee: Par-Kan Company, Silver Lake, IN (US)

( * ) Notice: Subject to any disclaimer, the term of this patent is extended or adjusted under 35 U.S.C. 154(b) by 0 days.

(21) Appl. No.: 14/813,791

(22) Filed: Jul. 30, 2015

(65) Prior Publication Data

US 2016/0031659 A1 Feb. 4, 2016

Related U.S. Application Data

(60) Provisional application No. 62/030,742, filed on Jul. 30, 2014.

(51) Int. Cl.
  *B65G 65/00* (2006.01)
  *A01C 7/20* (2006.01)
  *A01C 15/00* (2006.01)
  *B60P 1/42* (2006.01)

(52) U.S. Cl.
  CPC ............... *A01C 7/208* (2013.01); *A01C 15/003* (2013.01); *B60P 1/42* (2013.01)

(58) Field of Classification Search
  CPC ...... B65G 65/42; B65G 65/40; B65G 65/425; B65G 41/002; B65G 41/005; B60P 1/36; B60P 1/40; B60P 1/42; A01C 15/003

USPC ........... 414/299, 301, 302; 198/312, 315, 317
See application file for complete search history.

(56) References Cited

U.S. PATENT DOCUMENTS

| | | | | |
|---|---|---|---|---|
| 4,921,086 | A * | 5/1990 | Klutz | B65G 69/0458 193/23 |
| 5,888,044 | A | 3/1999 | Bakersville | |
| 8,820,515 | B2 * | 9/2014 | Houssian | A01D 57/00 198/666 |
| 8,919,526 | B2 * | 12/2014 | Fickeisen | E01C 19/48 198/317 |
| 2008/0210145 | A1 | 9/2008 | Petersen et al. | |
| 2010/0314221 | A1 * | 12/2010 | Garberson | A01C 15/003 198/617 |
| 2012/0201631 | A1 | 8/2012 | Fitzgerald et al. | |
| 2014/0227068 | A1 * | 8/2014 | Neufeld | B60P 1/36 414/304 |
| 2015/0307286 | A1 * | 10/2015 | Wolowski | B60P 1/42 414/293 |

* cited by examiner

*Primary Examiner* — Michael McCullough
*Assistant Examiner* — Mark Hageman (57) ABSTRACT

The present invention relates to a self-filling agricultural tender with a conveyor assembly attached to the tender by a bin coupling assembly, a detachable first connection point near the conveyor assembly inlet, and a vertically and horizontally rotatable connection linkage near the conveyor center of gravity, enabling the tender to be configured for travel, for the discharge of the conveyor portion to be positioned for remote loading, or for the discharge of the conveyor portion to be positioned for self-filling.

14 Claims, 8 Drawing Sheets

SELF-FILLING AGRICULTURAL TENDER

CROSS REFERENCES TO RELATED APPLICATIONS

This Application is a non-provisional continuation of, and incorporates in its entirety, previously filed provisional Application 62/030,742, Self-Filling Agricultural lender, filed Jul. 30,2014. This Application is further related to PCT Application, Self-Filling Agricultural Tender, filed on the same day hereof.

BACKGROUND OF THE INVENTION

The present invention relates generally to a self-filling agricultural tender with an improved connection between the conveyor assembly and the tender bin.

Agricultural tender apparatuses are well known to the art to transport and load seed, grain, and fertilizer. Such apparatuses typically include a bin for storing seed, a conveyor assembly for moving the seed stored in the bin to another nearby location, such for loading into the hopper of a planter, and a frame to which the bin is mounted to keep the bin stable and upright, and to allow the apparatus to rest stably on the ground for use, to rest stably on a trailer, or to otherwise be stably used or transported to a point of use. In agricultural tenders known to the art, the bin is a storage compartment, typically with an open or openable top to allow top-loading, and typically has an openable aperture or gate at the bottom. The conveyor assembly is generally disposed beneath the bin and the bin generally includes a funnel or hopper feature that allows products in the bin to fall from the opened gate at the bottom of the bin onto the transport means of the conveyor assembly. The conveyor assembly further generally includes a discharge portion remote from the funnel or hopper for discharge of the product. The conveyor assembly is generally of sufficient length and mobility to allow delivery of a product such as seed, grain, or fertilizer, to separate top-loaded planters or other machines adjacent to the tender. The conveyor assembly commonly pivots or rotates in both horizontal and vertical planes with respect to the bin to allow top-filling of such other machines. It is known to the art to configure a conveyor assembly to include an elevator portion, such as, for example, by including an augur. The elevator portion of the conveyor assembly is further generally contained within a housing, in part to minimize spillage or loss of the seed, grain, or fertilizer.

It is also known to the art for the conveyor assembly to be configured to have sufficient, mobility to "self-fill" the tender bin by positioning the discharge portion of the conveyor assembly above the open top of the tender bin and to load seed, grain, or fertilizer into the conveyor assembly hopper while the conveyor assembly is activated. For example, U.S. Pat. No. 8,221,047 discloses a seed tender that includes a main hopper for holding seed and a conveyor for transferring seed to and from the main hopper, where the main hopper rests on a frame, the conveyor is supported by a support arm anchored to a portion of the frame, and both the outlet portion and the inlet portion of the conveyor can pivot to allow the conveyor discharge to be positioned above the storage compartment of the bin or to allow movement of the inlet portion from a point directly under storage compartment to a point not directly under the storage compartment.

One primary disadvantage of self-filling hoppers known to the art is that the conveyor must be configured to be supported on a support, arm coupled to the frame. This requires the frame to include a subframe portion dedicated to holding the support arm. The addition of a dedicated subframe adds cost and manufacturing complexity that can be avoided by the advantageous design disclosed herein. Further, self-filling tenders known to the art suffer problems with the ability to precisely position the conveyor assembly, and also suffer problems with reliability of operation. Versions of the present invention have the advantage of improved rotational precision of the conveyor assembly, and improved reliability, compared to apparatuses known to the art. Further, the subframe component, of designs known to the art have the disadvantage of being connected to the frame through rivets, bolts, welds, or other mechanical connections. Each such connection is a potential failure point. Versions of the present invention have the decided advantage of minimizing the number of potential failure points compared to self-filling tender apparatuses known to the prior art.

SUMMARY OF THE INVENTION

Versions of the present invention are addressed to an improved self-filling agricultural tender with an improved direct coupling between the conveyor assembly and the tender bin.

In one embodiment of the present invention, the agricultural tender comprises a bin for holding, by way of example, seed, grain, or fertilizer; and a conveyor assembly disposed below the bin, the conveyor assembly including an inlet hopper, a discharge portion, an elevator, and a housing. The conveyor assembly is positionable to self-fill the bin, to unload product from within the bin to select locations outside of the bin, and for storage or travel. The conveyor assembly also includes a support member. The support member is rotatably connected to at least one of the housing and the elevator at a first connection point located near the inlet hopper, and is further connected to the conveyor assembly at a second connection point near the center of gravity of the conveyor assembly. The support member supports the elevator and housing through selected ranges of motion in the x-axis and y-axis. The support member may be further connected to the bin at a third connection point.

In one embodiment, the present invention further includes a bin coupling member coupling the support arm to the bin, the bin coupling member including a bearing disposed circumferentially around the bin outlet gate. This bearing, which is preferably geared, is in this embodiment configured to cooperate with a chain or sprocket for machine-assisted or machine-driven rotation of the conveyor assembly about the pivot point defined by the bearing; as will be described in detail, below.

In this embodiment, the bin may be unloaded by positioning the inlet hopper of the conveyor assembly underneath the bin outlet. When the bin outlet is opened, product falls from the bin, through the bin outlet, into the inlet hopper of the conveyor assembly to be transported by the elevator to the discharge portion. The conveyor assembly can be rotated about the bearing into a variety of positions to allow multiple machines, such as, for example, planters, to be top-loaded from the discharge portion without moving the tender bin. The conveyor assembly may farther be adjusted to raise or lower the discharge portion vertically, by raising of lowering the support, arm about a vertical pivot point located at the connection between the support arm and the bin, and optionally by a third connection point located between the support arm and the bin coupling member.

In this embodiment, the tender may further be self-filled by releasing a releasable connection connecting the support arm to one or more of the housing or elevator at a first connection point, then, rotating or pivoting the conveyor assembly about a linkage located at a second connection point to position the inlet hopper to a location remote from underneath the bin outlet. To achieve this self-filling position, the conveyor assembly rotates in one or more of the x axis and y axis about a linkage at a second connection point, said linkage connecting at least one of the the conveyor housing and elevator to the support arm at a position approximately at or near the center of gravity of the conveyor assembly exclusive of the support arm, to move the inlet hopper to a location remote from underneath the bin outlet and simultaneously to move the discharge portion of the conveyor assembly to a location over the top portion of the bin.

In this embodiment of the present invention, the elevator and the positioning of the conveyor assembly about the first, second, or third connection points, may each or all be driven by an engine, including driven by hydraulic arms, bars, or sprockets motivated by fluid pumped by an engine.

DETAILED DESCRIPTION

While embodiments of the present invention may be take many different forms, a preferred embodiment is described herein with the understanding that the present disclosure is to be considered as providing examples of the principles of the invention and such examples are not intended to limit the invention to preferred embodiments described herein.

As shown in the accompanying Figures, in its preferred embodiment the present invention comprises an agricultural tender comprising a bin, (1), a frame (3) supporting the bin (1) and a conveyor assembly (5).

A bin (1) in this preferred embodiment comprises a storage container for grain, seed, fertilizer, or other agricultural products that would be commonly transported or moved using a tender. The identity of such products, and the desired size, materials, and configuration of such a bin (1), would be understood by one skilled in the art. Grain, seed, fertilizer, and other such products that are or could be stored in the bin (1) will be referred to herein as "products."

In this preferred embodiment, the bin (1) is formed of metal and has a relatively wide closeable and openable top portion (7) that is generally open and is configured to allow the bin (1) to be top-filled by a separate machine or manually, or to be self-filled. by the tender conveyor assembly. In this preferred embodiment, the bin further has a relatively narrow bottom portion (9) comprising an outlet, which includes an openable and closeable gate (11) configured to allow products to be discharged by gravity from the bin when the gate (11) is in an open position and to retain products within the bin (1) with the gate (11) is in the closed position, in this preferred embodiment, the bin (1) further comprises walls (13) connecting the top portion (7) to the bottom portion (9), such walls (13) being preferably at least partially tapered so as to connect the relatively wide top portion (7) to the relatively narrow bottom portion (9).

The bin (1) is supported by a frame (3). The frame (3) includes legs (15) connected to the bin (1) and a base (17) connected to the legs (15). A variety of numbers of legs (15) and configurations and styles of legs (15) may be used, as would be appreciated by one skilled in the art. The base (17) preferably comprises a flat surface to support and stabilize the tender. The frame may further include a travel support (51) extending from at least one of the legs (15), or from the base, (17), said travel support (51) configured to support the conveyor assembly (5) during storage or travel of the tender, in some embodiments, the base (17) is carried, hauled or otherwise transported by a commercially available trailer. In a preferred embodiment, the base (17) comprises a trailer with wheels. The frame (3) may be made of any material suitable to support the weight of the tender, particularly when filled with product. Preferable materials include iron, steel, aluminum, and their alloys.

The conveyor assembly (5) of versions of the present invention comprises an inlet hopper (19), a discharge portion (21), an elevator (23), a housing (25), and a support member (27).

The inlet hopper (19) comprises a hopper for loading product, either manually or through a machine, as would be understood by one skilled in the art. In preferred versions hereof, the inlet hopper (19) is an aperture located on top of the housing (25) at substantially one end of the conveyor assembly (5), and is configured so that the inlet hopper (19) can be readily positioned underneath the gate (11) to accept product discharged from the bin (1) through the gate (11), and, in other configurations, can be placed at a location and height desirable to facilitate remote loading of product into the inlet hopper (19) manually or by a machine other than the tender.

The discharge portion (21) comprises an opening or aperture in the housing (25) remote from the inlet hopper (19) configured to discharge product loaded into the inlet hopper (19) to a location remote from the inlet hopper (19), after such product has been transported from the inlet hopper to the discharge portion (21) at least in part, by the elevator (23). As will be appreciated by one skilled in the an, the discharge portion (21) may include covers, baffles, flaps, gates, or shields to control the discharge of product.

An elevator (23) in versions hereof comprises a conveyor elevator configured to transport, product loaded into the inlet hopper (19) to the discharge portion (21). In the depicted preferred embodiment, a portion of the elevator (23) near one a first end of the elevator (23) is disposed substantially underneath, the inlet hopper (19) so that product loaded into the inlet hopper (19) will fall onto this first end of the elevator (23) and be transported by it to the remote discharge portion (21). As will be understood by one skilled in the art, a variety of product movement means can serve as an elevator (23) to transport product from the inlet, hopper (19) to the discharge portion (21) such as, for example, conveyor belt systems, conveyor compartment systems, or augur systems, hi the preferred embodiment, the elevator (23) comprises a conveyor belt system with rollers at each end and, preferably, protrusions extending upwardly from the conveyor belt surface at intervals to prevent product from rolling or falling opposite the direction of travel of the belt during transport, configured so that a roller is disposed near the discharge portion (21) so that when the belt turns downwardly over the roller disposed near the discharge portion (21), product is dropped off of the belt through the discharge portion (21). The elevator (23) may be, and is preferably, driven by an engine or motor (35). As will be appreciated by one skilled in the art, the elevator maybe driven indirectly by an engine or motor (35), such as through a hydraulic drive mechanism where hydraulic fluid is motivated under pressure by an engine or motor (35).

A housing (25) according to versions of the present invention comprises a container or shield at least partially surrounding the elevator (23), and configured to prevent, product from spilling off of the sides of the elevator (23) during transit from the inlet hopper (19) to the discharge portion (21). In a preferred embodiment, the housing (25) may also support one or more of a conveyor belt and rollers, and may further substantially envelop the conveyor belt and rollers except for apertures cooperative with the inlet hopper (19) and discharge portion (21). The housing (25) may comprise an inlet hopper (19) and a discharge portion (21) aperture.

Figure 5:
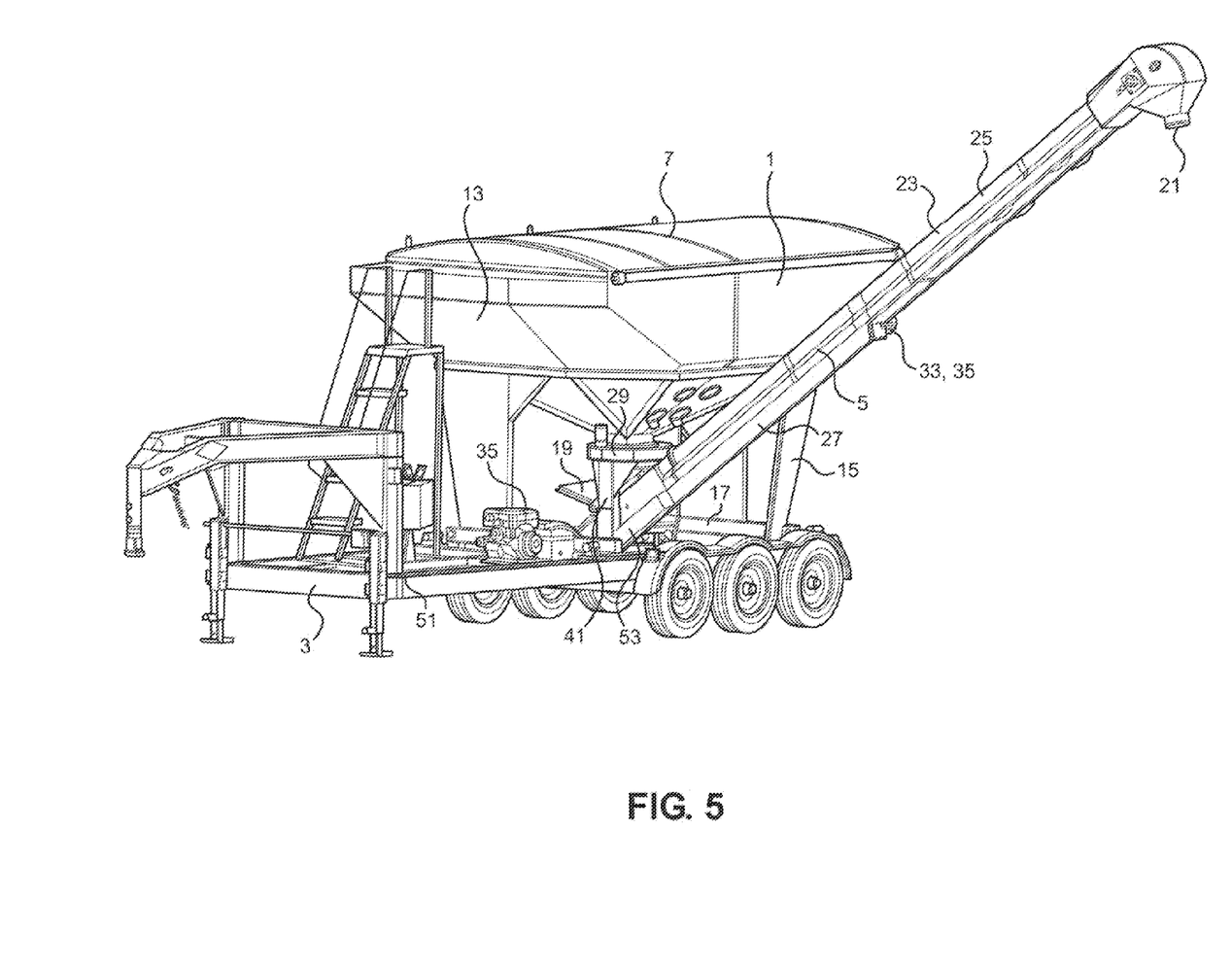
FIG. 5 shows a perspective view of one embodiment of the present invention in a remote unloading configuration.
Figure 6:
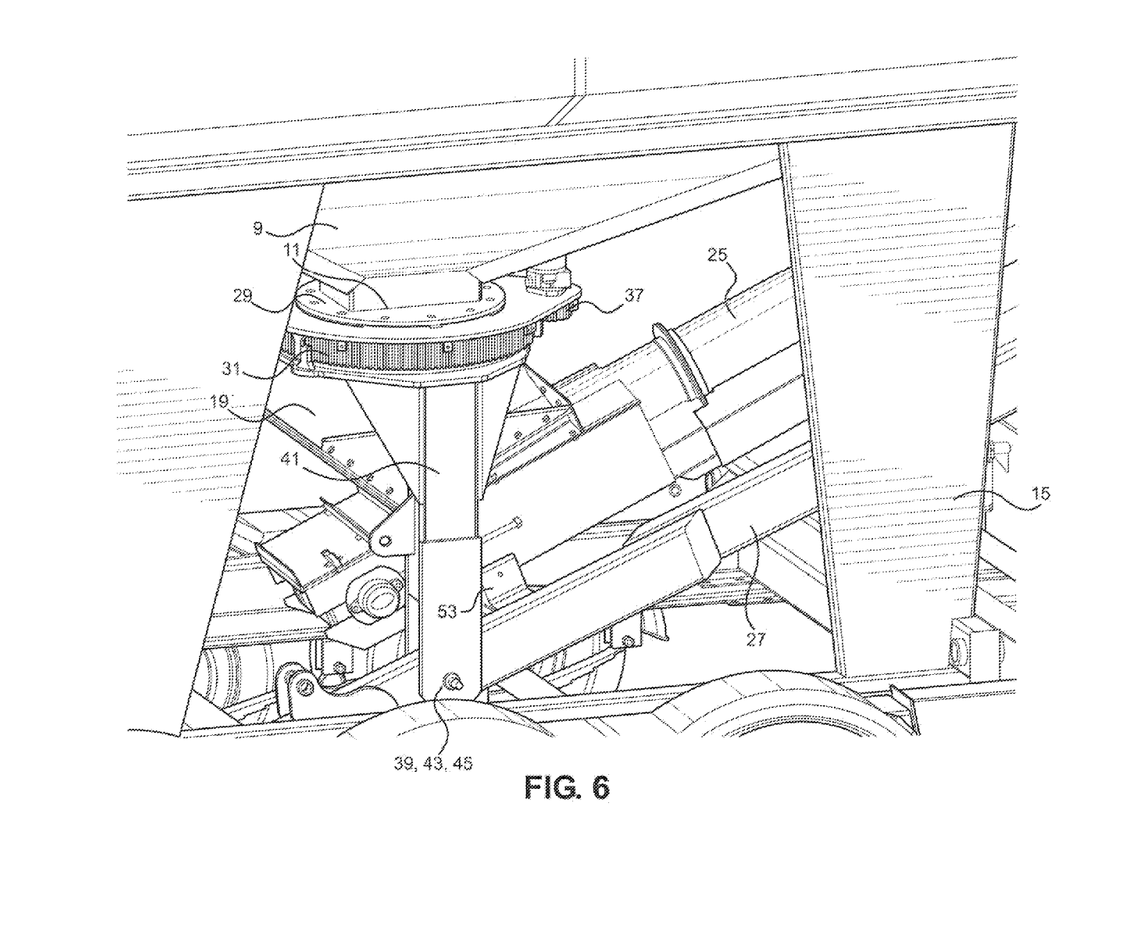
FIG. 6 shows an enlarged perspective view of a first side of the bin coupling assembly in one embodiment of the present invention in a travel configuration.
Figure 7:
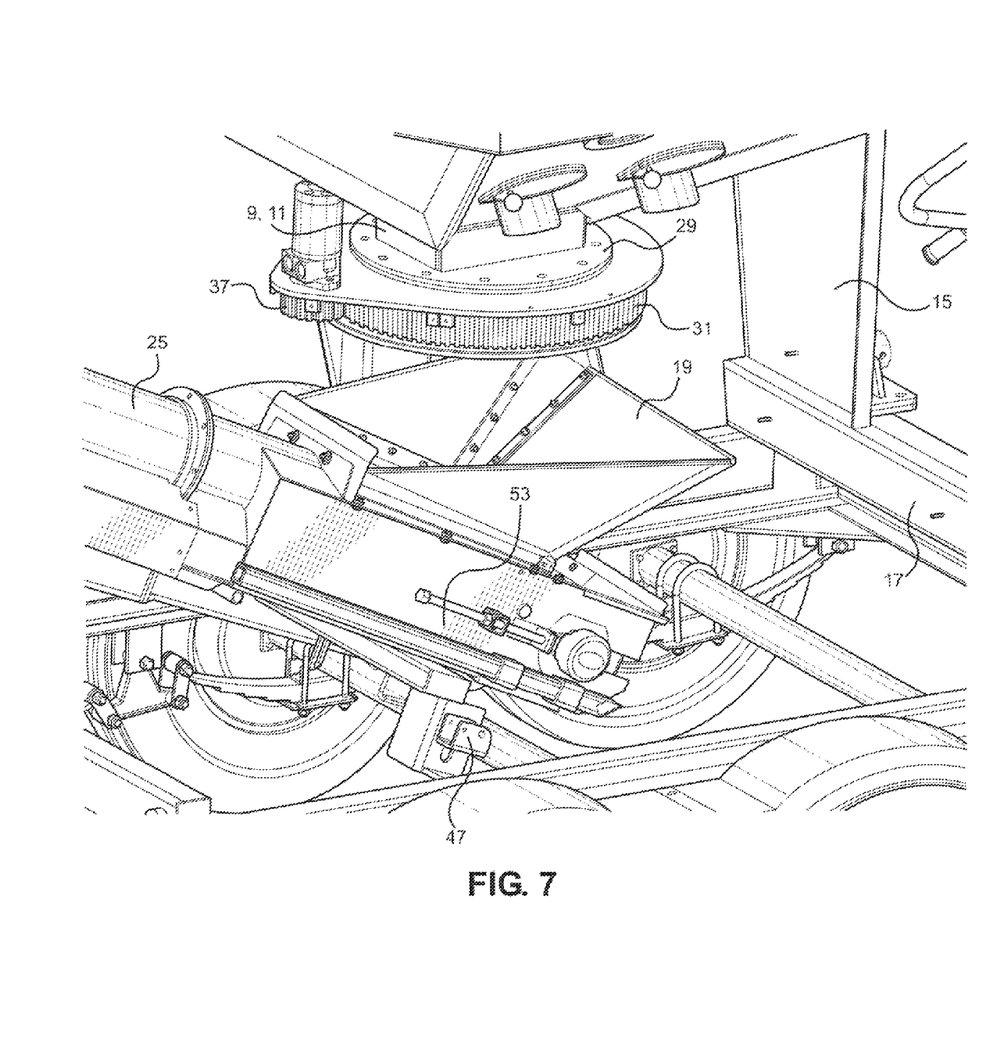
FIG. 7 shows an enlarged perspective view of a second side of the bin coupling assembly in one embodiment of the present invention in a travel configuration.
Figure 8:
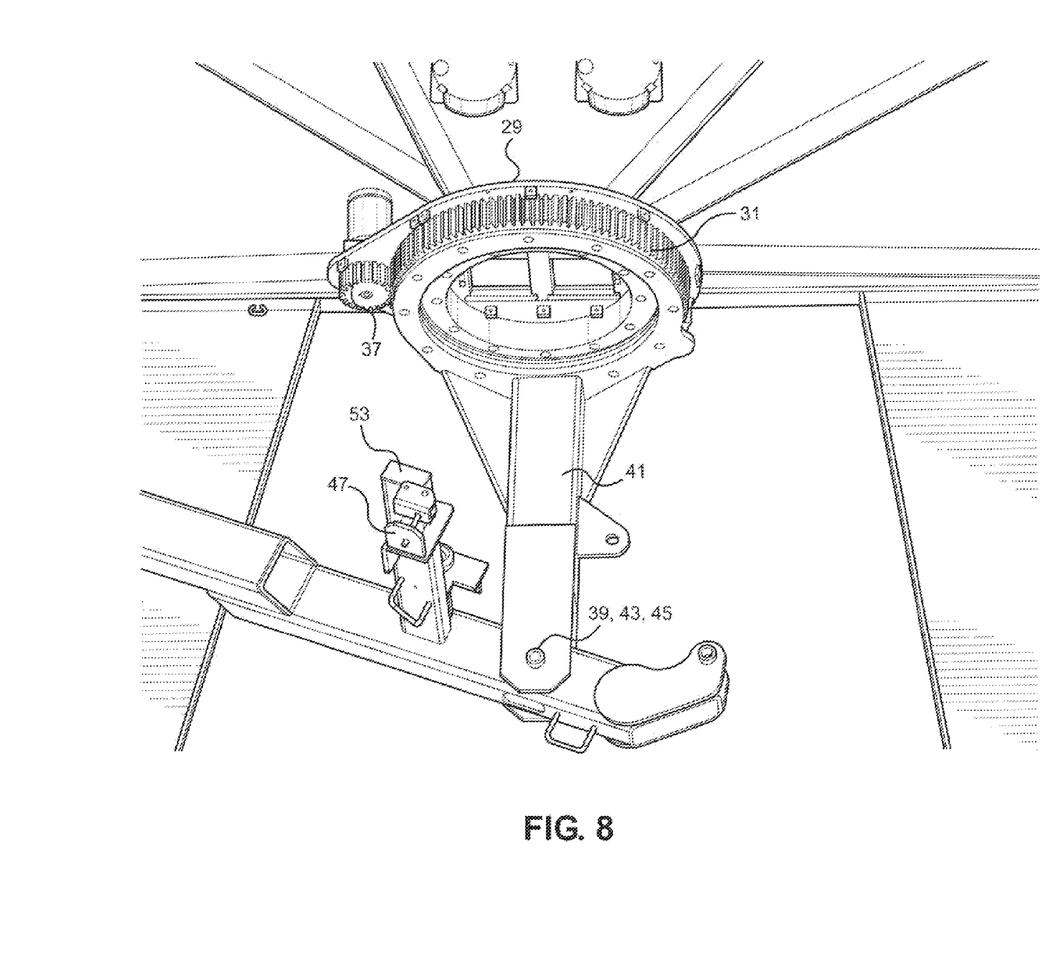
FIG. 8 shows a partial side elevation side view of the bin coupling assembly, shown for clarity without the conveyor assembly, in one embodiment of the present invention.

A support member (27) herein supports the conveyor assembly (5). The support member (27) is connected to the bin (1) by a bin coupling assembly (29). The bin coupling assembly (29), a preferred embodiment of which is depicted in detail in FIGS. 6 and 8, comprises in part a bearing portion (31) in the depicted preferred embodiment, the bin coupling assembly (29) permits rotation of the support member (27), and thus the conveyor assembly (5), about a pivot point, defined by the bearing portion (31) so as to allow substantial adjustability of the discharge portion (21) in the x-plane, as shown in FIG. 5. Preferably, such rotation is machine or engine driven. In one embodiment, the rotation is caused by a slew drive configuration, in which the bearing portion (31) is geared and is operatively connected to a slew. In a preferred embodiment, such rotation is caused by operative connection of an engine (35) to a sprocket (37) or and operative connection of the sprocket (37) to the bearing portion (31), such that turning of the sprocket (37) results in turning of the bearing portion (31) and thus in rotation of the support arm (27). The sprocket (37) may be operatively connected to the engine (35) directly or indirectly, such as through a hydraulic connection.

The bin coupling assembly (29) includes a downwardly depending member (41), and the support member (27) is connected to the downwardly depending member (41) by way of a vertical pivot coupling (39). The vertical pivot coupling (39) allows vertical movement of the support member (27), allowing adjustment of the height of one or more of the inlet hopper (19) and discharge portion (21). In the preferred embodiment, the vertical pivot coupling (39) comprises cooperating horizontal holes (45) in both the support member (27) and downwardly depending member (41) and a transverse pin (43) that fits through the cooperating horizontal holes (45) and secures the support member (27) to the downwardly depending member (41). In the preferred embodiment hereof, vertical movement of the support member (27) about the vertical pivot coupling (39) is machine or engine driven. In this preferred embodiment, an engine or motor (35) is operatively connected to the support, member (27) to drive vertical motion about the vertical pivot coupling, such as, as would be understood by one skilled in the art through an intermediate structure like a hydraulic arm (49) coupled to the support member and motivated by hydraulic fluid placed under pressure by the engine (35). In a preferred embodiment hereof, this hydraulic arm is coupled at one end to the support member (27) and at the other end to the downwardly depending member (41) such that the support arm pivots vertically about the vertical pivot coupling (39) when the hydraulic arm (49) is actuated.

The support member (27) is further connected to the conveyor assembly (5) at two additional points; a first connection point (53) near the inlet hopper (19), and a second connection point (55) near the center of gravity of the conveyor assembly (5) exclusive of the support, arm (27). At the first connection, point (53), the support member (27) is connected to one or more of the elevator (23), the housing (25), or the inlet hopper (19). The connection of the first connection point (53) is releasable. In a preferred embodiment hereof, this connection comprises a latch assembly (47) for either locking the first connection point (53) to prevent movement about the second connection point (55), or releasing the first connection point (53) to allow movement about the second connection point (55). At the second connection point (55), the support member (27) is connected to the conveyor assembly (5), and preferably to the housing (25), by a linkage (33) located at approximately the center of gravity of the conveyor assembly (5) exclusive of the support member (27). The linkage (33) is configured, to permit both horizontal and vertical pivoting of the housing (25) and elevator (23) with respect, to the support member (27). When, the releasable connection of the first connection point (53) is released, the conveyor assembly (5) can move, and preferably pivot, about the linkage (33) of the second connection point (55) both, horizontally to adjust the location of the inlet hopper (19) and discharge portion (21) with respect to the bin (I) and vertically to adjust the heights of one or more of the inlet hopper (19) and discharge portion (21).

Figure 1:
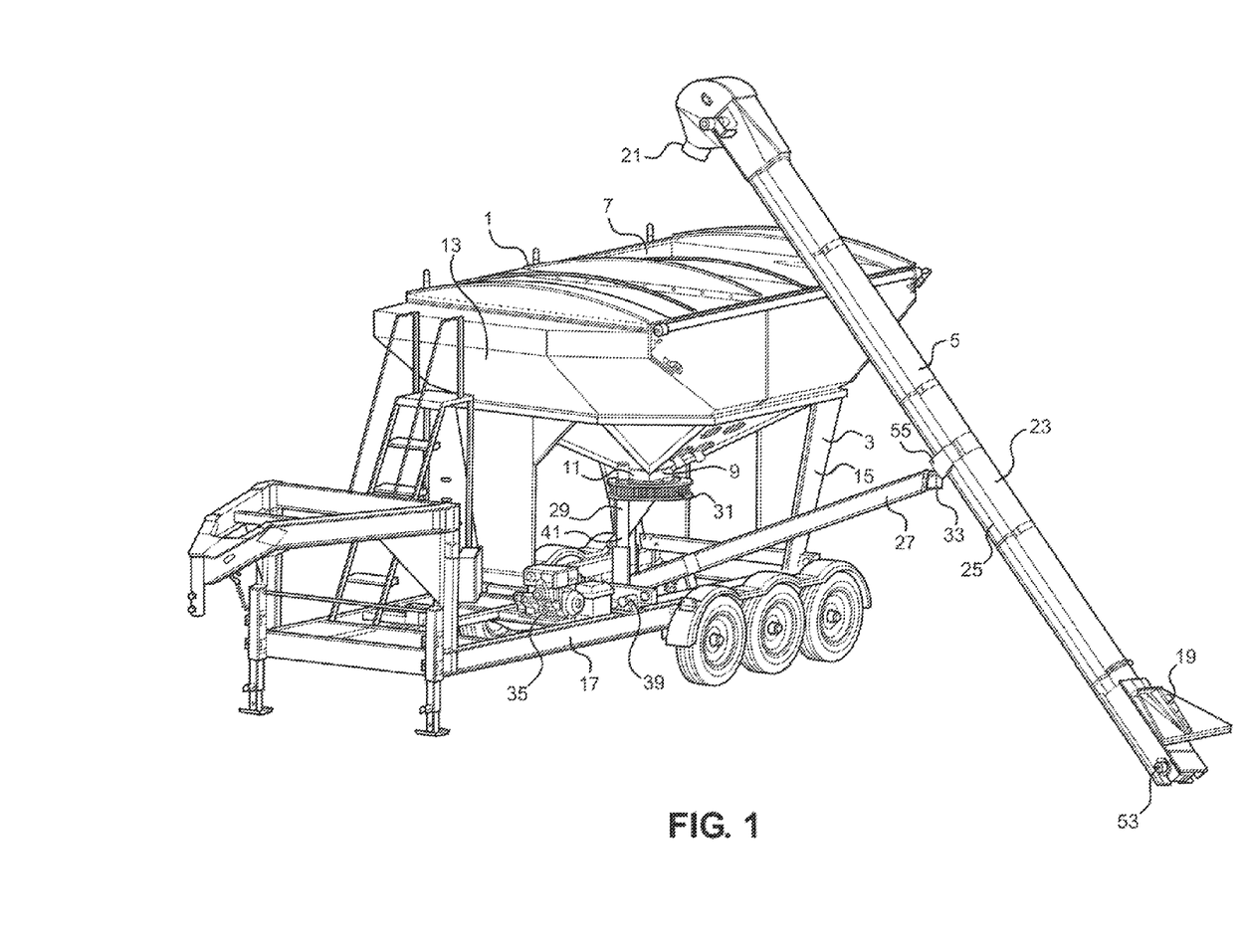
FIG. 1 shows a perspective view of one embodiment of the present invention in a self-fill configuration.
Figure 2:
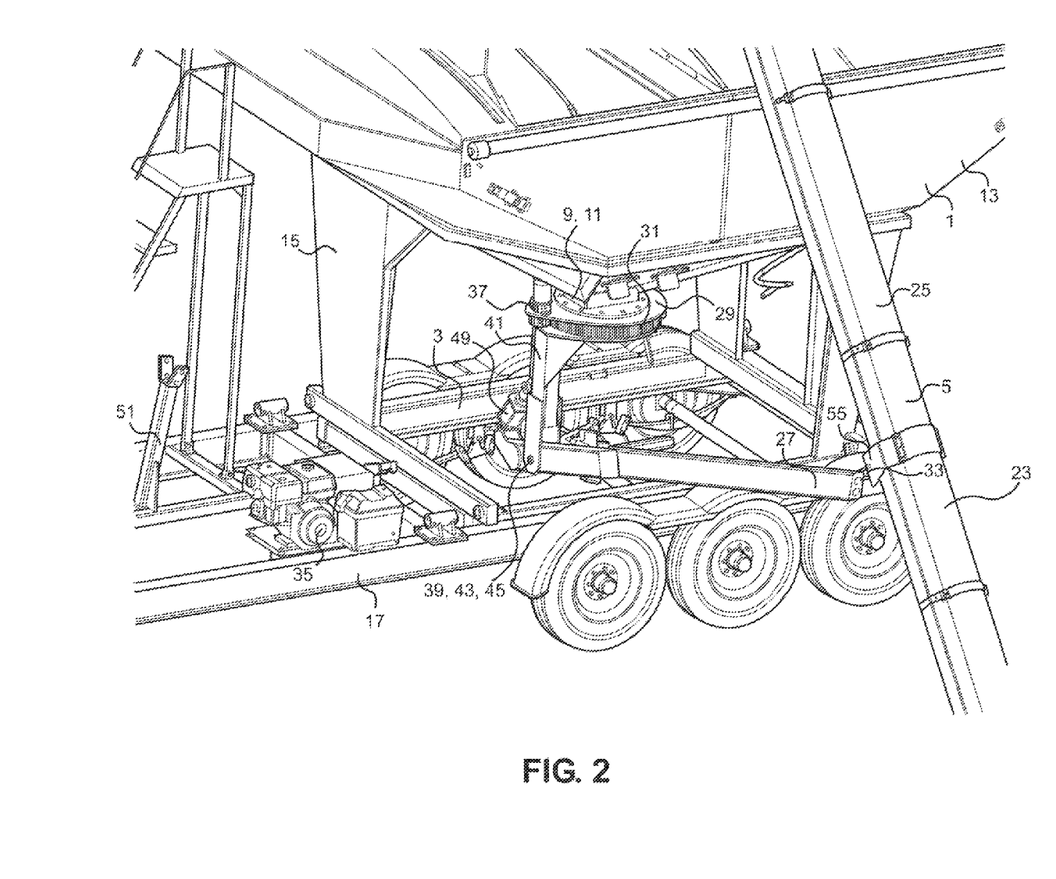
FIG. 2 shows an enlarged perspective view of the bin coupling assembly in one embodiment of the present invention in a self-fill configuration.
Figure 3:
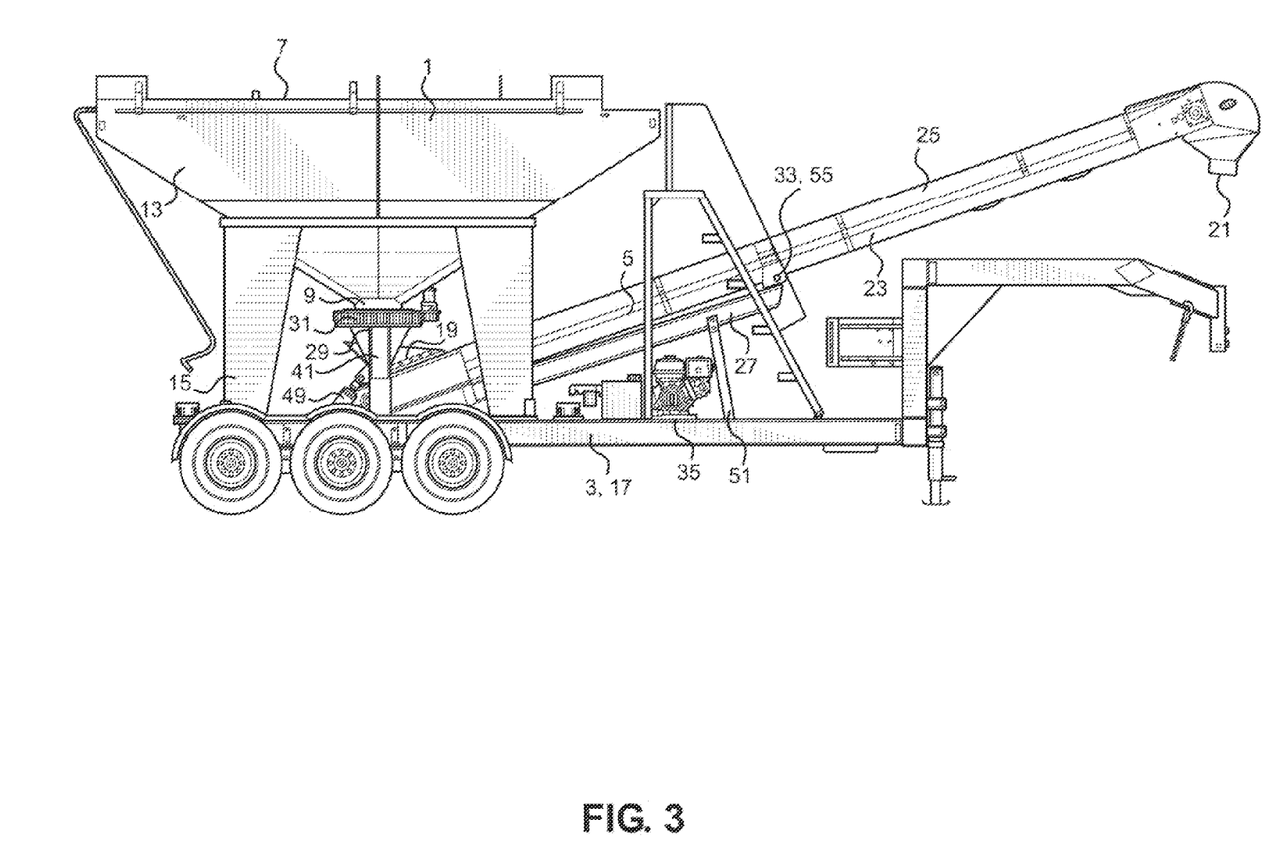
FIG. 3 shows a side view of a first side of one embodiment of the present invention in a travel configuration.
Figure 4:
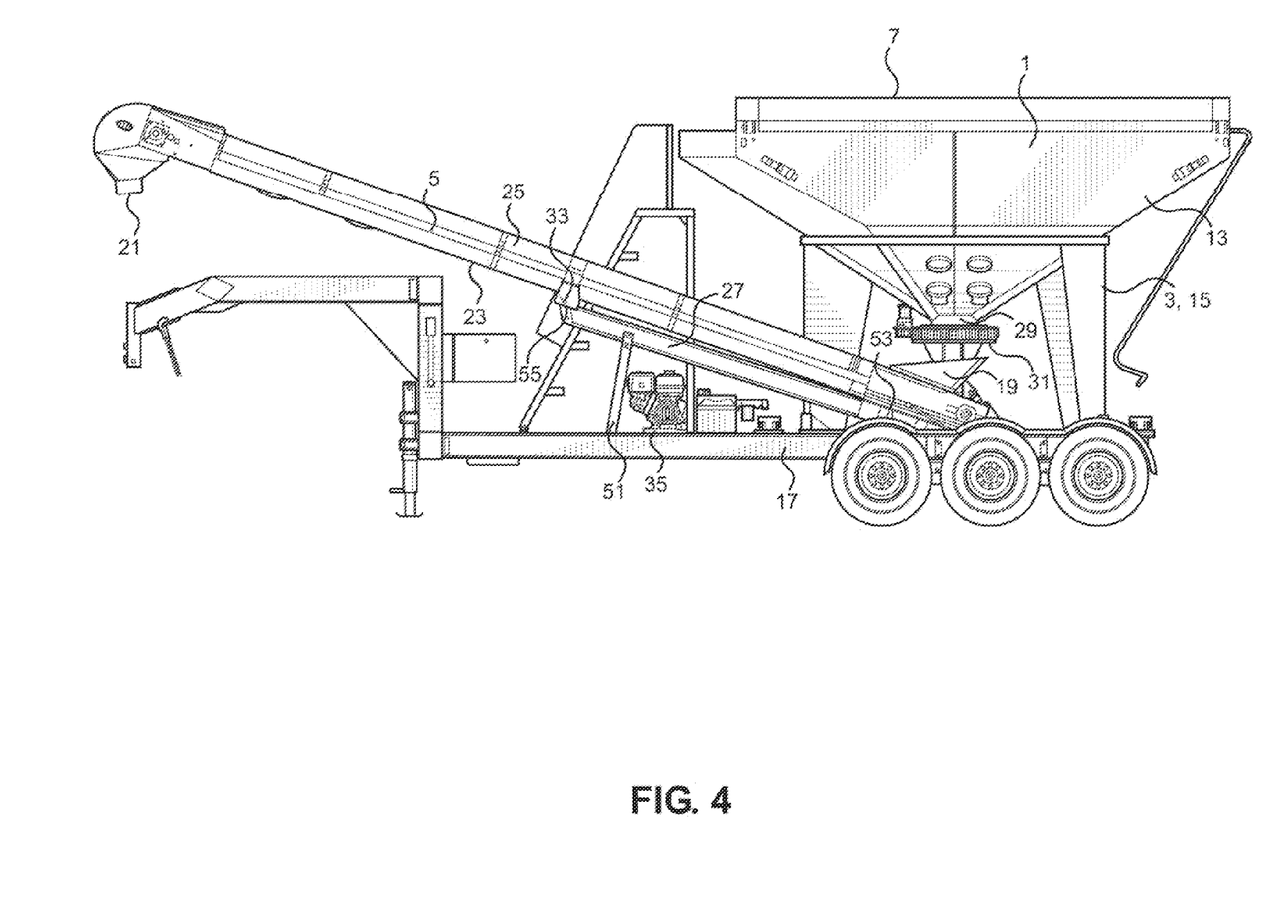
FIG. 4 shows a side view of a second side of one embodiment of the present invention in a travel configuration.

In the preferred embodiment hereof, the tender is configurable either to self-fill the bin, as shown in FIG. 1, to unload product from within the bin, as shown in FIG. 5, or for storage or travel, as shown in FIG. 3. As will be appreciated by one skilled in the art, the conveyor assembly can also be positioned to a variety of intermediate or other positions permitted by the structures described herein.

In the self-fill configuration, as can be seen in FIG. 1, the housing (25) is detached from the support member (27) by releasing the releasable connection at the first connection point (53). The housing (25) and elevator (23) are rotated horizontally about the linkage (33) until, the inlet hopper (19) is located at a position remote from the bin (1) and the discharge portion (21) is located above the bin top portion (7) at a location suitable for loading the bin (1). The height of the inlet hopper (19) and discharge portion (21) are adjusted as desired using the vertical pivot of the linkage (33). Further, the position of the linkage (33) in the x-axis plane can further be adjusted by rotation about the bearing portion (31), and position of the linkage (33) in the y-axis plane can be further adjusted by vertical movement of the support member (27) about the vertical pivot coupling (39).

In the unloading configuration in, as can be seen in FIG. 5, the housing (25) is attached to the support member (27) by attaching the releasable connection at the first connection point (53) such that the inlet hopper (19) is positioned substantially beneath the gate (11). The location of the discharge portion (21) is adjusted to a position suitable for loading another remote machine, such as a planter, by rotating the bearing portion (31). Further, the height of the discharge portion (21) can be adjusted by moving the support member (27) up or down about the vertical pivot coupling (39).

In the storage or travel configuration, as can be seen in FIG. 3, the housing (25) is attached to the support member (27) by attaching the releasable connection at the first connection point (53) such that the inlet hopper (19) is located substantially beneath the gate (11). The position of the discharge portion (21) is adjusted so that the support member (27) rests on and is preferably partially retained by a travel support (51). Further, the height of the discharge portion (21) can be adjusted by moving the support member (27) up or down about the vertical pivot coupling (39) so that the support member (27) rests on and is supported and stabilized by the travel support (51).

A number of illustrative and preferred versions have been described above with reference to the drawing figures. Although the invention has been described based upon these versions, it would be apparent to those of skill in the art that certain modifications, variations, and alternative constructions could he made to the described embodiments within the spirit and scope of the invention.

What is claimed is:

1. An agricultural tender comprising:
   (a) a bin comprising a top portion, a bottom portion, walls connecting said top portion to said bottom portion, and a gate in said bottom portion;
   (b) a bin coupling member comprising an annular rotatable bearing, wherein said bin coupling member is coupled to said bin bottom portion such that said gate is positioned within the aperture of said bearing, and wherein said bin coupling member further comprises a downwardly depending member;
   (c) a frame supporting said bin comprising one or more legs attached to said bin, a base attached to said one or more legs;
   (d) a conveyor assembly comprising an inlet hopper, a discharge portion remote from said inlet hopper, an elevator connecting said inlet hopper to said discharge portion, a housing, and a support member;
   (e) wherein said support member is connected to said downwardly depending member by a vertical pivot coupling, is further releasably connected to one or more of said housing or said elevator by a releasable connection at a first connection point, and is further pivotally connected to one or more of said housing and said elevator at a second connection point.

2. The agricultural tender of claim 1, wherein said second connection point comprises a linkage capable of both vertical and horizontal movement, and said second connection point is located near the center of gravity of said conveyor assembly exclusive of said support member.

3. The agricultural tender of claim 2, wherein said conveyor assembly pivots horizontally and vertically about said linkage when said releasable connection is released.

4. The agricultural tender of claim 3, wherein said first connection point comprises a latch assembly and is located between said second connection point and said inlet hopper.

5. The agricultural tender of claim 4, wherein said latch assembly has an open position, in which said releasable connection is released, and a closed position, in which said releasable connection is not released.

6. The agricultural tender of claim 5, wherein when said latch assembly is in the closed position, the location of said inlet hopper and said discharge portion is adjustable vertically by movement of the conveyor assembly about the vertical pivot coupling.

7. The agricultural tender of claim 6, wherein when said latch assembly is in the closed position, the location of said inlet hopper and said discharge portion is adjustable horizontally by rotation of the bearing.

8. The agricultural tender of claim 7, wherein said conveyor assembly is positionable to load a machine remote from said agricultural tender.

9. The agricultural tender of claim 5, wherein when said latch assembly is in the open position, the location of said inlet hopper and said discharge portion is further adjustable horizontally and vertically about said linkage.

10. The agricultural tender of claim 9, wherein said conveyor assembly is positionable to load a machine remote from said agricultural tender and is positionable to self-load said agricultural tender.

11. The agricultural tender of claim 10, wherein said inlet hopper is positioned substantially over one end of said elevator and said discharge portion is positioned substantially under an opposite end of said elevator.

12. The agricultural tender of claim 11, wherein said elevator comprises at least one of an augur and a conveyor.

13. The agricultural tender of claim 12, wherein said base comprises a trailer with a plurality of wheels.

14. The agricultural tender of claim 12, further comprising a travel support.

* * * * *